Figure 3:
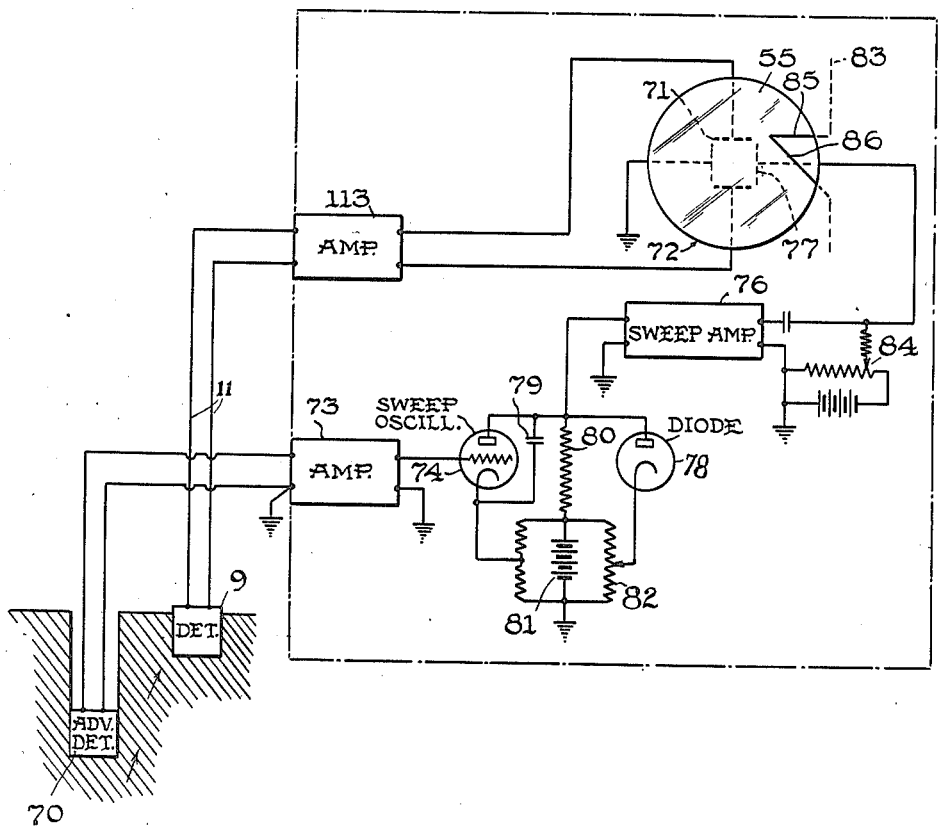

Jan. 12, 1943.   O. F. RITZMANN   2,308,390
APPARATUS FOR DETECTING AND EXHIBITING EXPLOSIONS IN WELLS
Filed Dec. 9, 1940   2 Sheets-Sheet 1
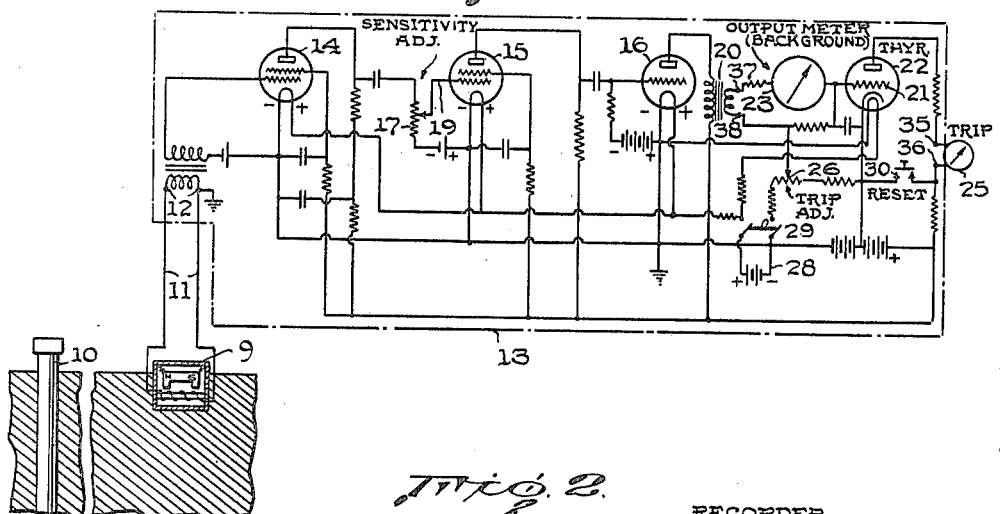
Fig. 1.
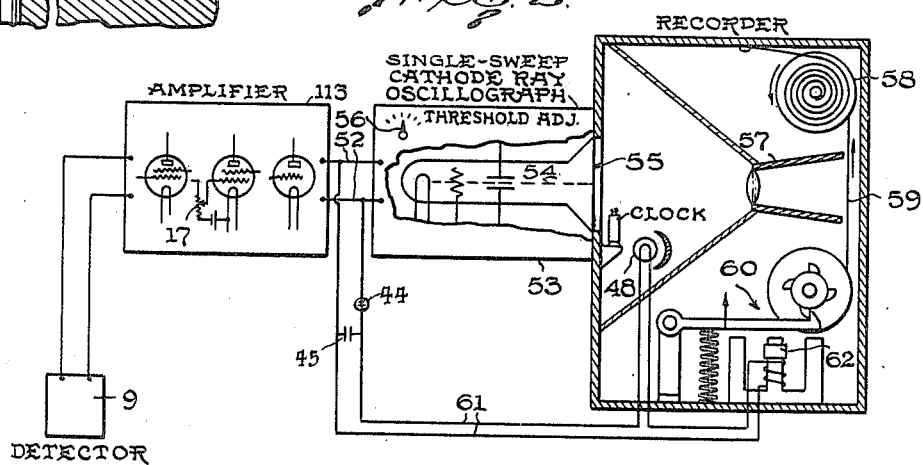
Fig. 2.
Fig. 4.
Fig. 5.
Inventor
Otto F. Ritzmann,
By A. M. Houghton
his Attorney Jan. 12, 1943. O. F. RITZMANN 2,308,390
APPARATUS FOR DETECTING AND EXHIBITING EXPLOSIONS IN WELLS
Filed Dec. 9, 1940 2 Sheets-Sheet 2

Inventor
Otto F. Ritzmann,
By A. M. Houghton
his Attorney

Patented Jan. 12, 1943

2,308,390

UNITED STATES PATENT OFFICE 2,308,390

APPARATUS FOR DETECTING AND EXHIBITING EXPLOSIONS IN WELLS

Otto F. Ritzmann, Aspinwall, Pa., assignor to Gulf Research & Development Company, Pittsburgh, Pa., a corporation of Delaware Application December 9, 1940, Serial No. 369,368

3 Claims. (Cl. 177—352)

This invention or discovery relates to apparatus for and methods of detecting and exhibiting explosions in wells; and it comprises an apparatus for such purposes including means for detecting terrestrial vibrations and producing an electrical signal corresponding thereto, said means being placed in the earth remote from the well, an electrical circuit connected thereto, electrically operable means connected thereto and adapted to produce an effect on appearance thereat only of energy above a predetermined magnitude, and means for exhibiting the effect produced by said electrically operable means; and it further comprises a method of exhibiting the instant of explosions in wells, including the operations of detecting vibrations with the aid of a detector circuit, at a point in the earth remote from the well head whereby to minimize disturbance by vibrations occurring thereat, supplying the detector output to an exhibiting device of type which trips at a predetermined energy level, and adjusting the sensitivity of the detector circuit to a value such that the output thereof, for such vibrations as occur prior to the explosion, is less than said energy level; all as more fully hereinafter set forth and as claimed.

In putting wells into producing condition it is usual to fire a heavy charge of dynamite or other explosive in the producing region of the well, to shatter the rock and open up channels for oil flow. Ordinarily it is impracticable to run electric wires down to the charge, so that indirect methods are employed. Detonation is by time bomb or dropping a weight. These expedients do not always explode the charge and there is no immediate way of knowing whether or not the charge has fired. Usually the explosion is heard or felt at the surface but in some cases, especially with small charges or in a deep well, the explosion is not readily detectable. Detection is especially difficult when extraneous vibrations are present, such as with nearby machinery in operation, highway traffic, flowing water, etc. It is important to know whether or not the charge explodes, because if it does not explode, and tubing, etc., is unwittingly lowered on to the unexploded charge, serious damage may occur.

Among the objects of the present invention are the provision of an apparatus for detecting well explosions, of sensitivity sufficient to pick up even feeble impulses reaching the surface of the earth therefrom, and of selectivity such as to differentiate between these impulses and extraneous vibrations; the provision of such an apparatus capable of being applied to the earth at a considerable distance from the well, whereby disturbances due to activities around the well head are minimized, the provision of an apparatus for detecting well explosions including electrical seismic wave-detecting means, an electrical translating device of on-and-off type connected thereto and adapted to produce an effect on appearance of signal energy above a predetermined level and means for exhibiting said effect; and the provision of such an apparatus in which the energy required to produce an annunciation or signal can be adjusted to a predetermined value above the energy level corresponding to extraneous vibrations.

The invention in its best embodiment includes a detector, conveniently of the seismograph type, buried in the earth some distance away from the well and connected to an amplifier which is adjustable as regards its gain or sensitivity. An annunciating or recording device, of a type adapted to produce its annunciation or record on appearance of energy above a predetermined level while remaining out of action, so to speak, during receipt of energy below this level, is connected to the amplifier output in a circuit adjustable as to sensitivity, that is, as to the amount of energy required to produce the annunciation. By the first adjustment, the gain of the amplifier can be reduced or increased according to whether the energy level of extraneous vibrations is high or low. By the second adjustment, the annunciator can be made to trip at a predetermined energy level above the extraneous energy level. For example, if the extraneous vibrations are irregular, with pronounced maxima and minima, as in the case of gusts of wind, this differential is made greater than if the vibrations are regular, such as with nearby electrical machinery. With proper operation, annunciation of the shot moment is definite and certain. Means are provided for recording the shot impulse if desired.

In the accompanying drawings there are shown diagrammatically four examples of specific embodiments of apparatus within the purview of the invention. In the drawings, Fig. 1 is a diagrammatic view of a form of the invention embodying a thyratron tripping and annunciating device, Fig. 2 is a view of a modified embodiment making use of a single-sweep cathode-ray oscillograph for exhibiting and recording the shot instant, Fig. 3 is a diagrammatic view of a modification of the apparatus of Fig. 2, and Figs. 4 and 5 are views illustrative of expedients for recording the explosion time in the apparatus of the invention.

Referring to Fig. 1, the apparatus includes a detector 9, conveniently an ordinary seismograph detector, adapted to produce an electrical current in leads 11 therefrom on receipt of earth tremors at the detector. The detector is set in the earth a suitable distance from a well, the casing of which is indicated at 10, in which a charge of dynamite, etc. is to be fired for opening up the well; the shot not being shown. The detector leads are connected to the input 12 of an amplifier 13, shown as including three amplifying stages 14, 15 and 16, with a variable resistor 17 for the grid circuit 19 of one of the stages to provide adjustment of the sensitivity or gain of the amplifier. The output of the last stage is coupled through a transformer 20 with the grid 21 of a thyratron tube 22, a rectifier-type voltmeter 23 being interposed in this connection as shown. The voltmeter exhibits the background disturbance picked up by the detector and amplified by the amplifier. For example, if there is a pump operating nearby, meter 23 indicates a voltage proportional to the average amplitude of the pump vibrations picked up by the detector. In the field, resistor 17 is adjusted to bring the voltmeter reading to a value slightly below the voltage required to trip the thyratron.

If meter 23 has a range sufficient to exhibit on its scale all levels of background noise encountered adjustment 17 can be omitted, but ordinarily it is more convenient to have the meter 23 of limited range and to provide adjustment 17 as described, for the sake of accuracy and convenience.

The plate circuit of the thyratron tube includes a milliammeter 25, connected at points 35 and 36, which indicates the thyratron plate current when it is tripped, and reads zero before it is tripped. Means are provided for varying the voltage required to trip the thyratron, including a variable resistor 26. A filament supply battery 28 with switch 29 is provided. A push button switch 30 is provided in a shunt across the thyratron plate circuit whereby the apparatus is reset after use.

In operation, assuming the charge of dynamite to be positioned in the well ready to be fired, first resistor 17 is adjusted until the voltage registered at meter 23 is a suitable value below the trip voltage of the thyratron. If the ground is very quiet the movable contact will be moved farther up on resistor 17 during this adjustment than if the ground is disturbed by machinery, etc. To adjust the voltage at which the thyratron trips, resistor 26 is adjusted until the thyratron trips at some desired voltage (exhibited by meter 23) when the ground near the detector is given a light shock as by stamping the foot or throwing a pebble on it.

These adjustments are made before the time when the shot is supposed to go off. If the shot explodes, a second or so later meter 25 kicks sharply, corresponding to receipt of the detector signal and tripping of the thyratron thereby. The meter stays in deflected position until button 30 is pressed to reset the apparatus. Meter 23 also kicks when the shot goes off but only momentarily, so that it is usually more convenient to use meter 25 as the shot annunciator. If meter 23 is used to announce the explosion it is best provided with a small magnet as at 46 in meter 43 of Fig. 4, so that its deflection is maintained and will not be overlooked in case the operator is not watching the apparatus exactly at the time of receipt of the explosion wave.

The necessary adjustments vary considerably with different well situations, but are readily made following the principles described. Usually, background noise is highly variable. In one case the operator may observe the deflections of meter 23 for thirty seconds or even much longer and adjust control 17 so that the highest deflections would be 0.5 to 1.0 volt. Then the trip point may be set to 2.0 volts with control 26. This value gives a good factor of safety against accidental tripping. If the expected wave intensity is less than 2 volts at meter 23 the trip is set lower. If the background noise is due mainly to a steady disturbance such as an engine, it is possible to set the trip point much closer to the indicated voltage because of the improbability of large variations in amplitude. Normally meter 23 will be in constant motion, and with proper adjustment reads about 0.1 volt much of the time, with kicks of 0.2 or 0.3 volt occurring frequently, and kicks of 0.5 volt or more occurring only occasionally. The well shot vibration should exceed the maximum noise peak 2 to 1 or more in amplitude. The relative amplitude of the well shot vibration in some cases is much greater; perhaps 50 times the strength required to trip the device. In this case the meter 23 may go slightly off scale but the tube circuits are designed so that the tubes may overload and prevent damage to the meter.

The detector is best buried in a quiet location, as far from the well as is conveniently practicable so that ordinary movements and operations about the well head will not affect it. A distance up to several hundred feet is readily feasible because of the considerable sensitivity of my apparatus. The amplifier-annunciator need not of course be located near the detector; it can be placed anywhere that is desired with connection by a suitable cable. Any suitable detector can be employed, including electromagnetic, piezoelectric and variable capacitance types. The amplifier can be of the tunable type if desired, this being convenient where a regular disturbing frequency, such as a gasoline engine vibration, is present; the amplifier being tuned to reject such frequency. Automatic volume control and other auxiliary features can be employed if desired.

In some cases it is desirable to exhibit the amplified electric impulse corresponding to the received shock, in a somewhat different manner. Referring to Fig. 2, the detector is shown connected to an amplifier 113, which is or can be like the first three stages of the amplifier of Fig. 1 and having a sensitivity control 17. The output is connected by leads 52 to a cathode-ray oscillograph 53 of a single-sweep type, which incorporate a sweep circuit (described in connection with Fig. 3) adapted to keep the cathode ray 54 off the edge of fluorescent screen 55 until a signal of a predetermined amplitude is received; such critical amplitude being determined by the setting of a threshold adjustment 56 in the oscillograph. The amplified earth tremor corresponding to the blast triggers the sweep circuit and causes the ray 54 to sweep once over the screen. The sweep does not reoccur until or unless another strong wave is received. Thus transients can be clearly observed; or can be photographed by provision of a suitable camera also shown in Fig. 2. As shown, a camera 57 with spring-urged film reel 58 and film 59 is focused on the oscillograph screen. An electromagnetic escapement 60 releases the film for shifting thereof, upon energization of the escapement, which is connected to the amplifier output through leads 61. A slight time delay is afforded by a heavy copper ring 62 on the pole piece of the escapement, which retards buildup of magnetic flux. This expedient prevents premature shift of the film. A clock (not numbered in Fig. 2) and lamp 48 can be provided as shown, for simultaneous recording of the impulse time. The oscillograph sweep can be tripped in about 0.001 second so that only a very small part of the record is lost. If desired, provision can be made to compensate for this slight time lag, as shown in Fig. 3.

Fig. 3 shows the oscillograph arrangement of Fig. 2 in detail and also serves to illustrate an embodiment of the invention wherein an advance detector is employed in conjunction with a regular detector to assure operation of the exhibiting means at the correct time.

As shown, an advance detector 70 is positioned in the earth somewhat closer to the shot in the well (not shown) than the main detector 9, so as to receive the shock wave first. Detector 9 is connected through amplifier 113 to the vertical-sweep plates 71 of cathode ray tube 72. The advance detector is connected through a similar amplifier 73 to a sweep oscillator thyratron tube 74, the output of which is delivered through a sweep amplifier 76 to the horizontal-sweep plates 77 of the cathode ray tube.

The circuit for plates 77 includes a diode 78 to prevent the tube 74 from reaching a high enough plate voltage to trip. The oscillator would otherwise generate a saw-tooth wave by the gradual charge of condenser 79 through resistor 80 from battery 81 and its rapid discharge through the thyratron. The thyratron normally trips or discharges at a certain positive plate potential but this potential is not quite reached because the diode draws a leakage current as soon as the plate voltage of both tubes approximates the positive voltage applied to the diode cathode by means of an adjustable voltage divider 82 operated by a knob 56 (Fig. 2). This voltage divider is adjusted so that the tube just fails to oscillate, yet the condenser is kept charged nearly to the discharge point. Then any signal received by the advance detector will make the thyratron grid slightly less negative and thereby allow it to trip or discharge one time. It will not trip again until the condenser is recharged and unless additional waves are received at the grid of the thyratron. The length of time required for the sweep may be set at a convenient value, usually between one second and one-twentieth of a second.

In operation, before receipt of signal the cathode ray is kept at the right of the fluorescent screen as indicated diagrammatically at 83. This is done by adjusting the bias on the horizontal-deflection plates by means of a voltage divider 84. When a signal is received by the advance detector the sweep oscillator makes one complete oscillation, sending the spot to the left at 85 with great rapidity and returning it at a uniform writing rate at 86 until the original position is reached.

It is sometimes desirable to record the time at which the explosion impulse is received. This is readily accomplished. In Fig. 4 an electric clock 40 supplied by a battery 41 through a protective resistor 42 is connected in shunt with a meter type relay 43 supplied from output 35, 36 of an amplifier 113 as in Fig. 2 through a rectifier 44, a condenser 45 advantageously being provided as shown, to assist the rectifying action. A small magnet 46 arranged as shown holds the relay closed after operation until it is manually opened again. In operation, the received impulse stops the clock and thereby exhibits or records the instant of receipt of the explosion impulse. In Fig. 5, a relay 47 is arranged to energize a lamp 48 illuminating an ordinary watch or clock 50 whereby a photograph of the clock reading is made by camera 49. Lamp 48 can be an ordinary lamp, in which case a series of superposed exposures is possible, or a flash lamp, for a single exposure. Condenser 45 serves to prevent too rapid opening of the relay. In using the expedient of Fig. 5 with amplifier 113, burning out of the flash bulb can be taken as indicative of occurrence of the explosion.

What I claim is:

1. An apparatus for exhibiting occurrence of explosions created in a bore, in regions subject to extraneous vibrations, comprising, in combination with a seismic wave detector, an adjustable-gain amplifier, means in circuit with said amplifier for exhibiting the magnitude of extraneous terrestrial vibrations, an adjustable-critical-level trip circuit energized by said amplifier in response to terrestrial vibrations above a selected critical level, and energy exhibiting means in said trip circuit.

2. The apparatus of claim 1 wherein the adjustable-critical-level trip circuit includes a thyratron tube having a grid circuit in energy receiving relation to the detecting means and a plate circuit, and which further includes as energy exhibiting means a meter in said plate circuit.

3. An apparatus for exhibiting occurrence of explosions created in a bore, in regions subject to extraneous vibrations comprising, in combination with a seismic wave detector, means including an adjustable-gain amplifier for exhibiting the magnitude of extraneous terrestrial vibrations, a critical-level trip circuit energized by said amplifier in response to terrestrial vibrations above a selected level, energy exhibiting means in said trip circuit, and means for adjusting the critical energy level of the exhibiting means.

OTTO F. RITZMANN.